June 15, 1965
A. J. STARR
3,189,072
CONTAINER OUTLET AND CLOSURE THEREFOR
Filed Feb. 8, 1963
2 Sheets-Sheet 1
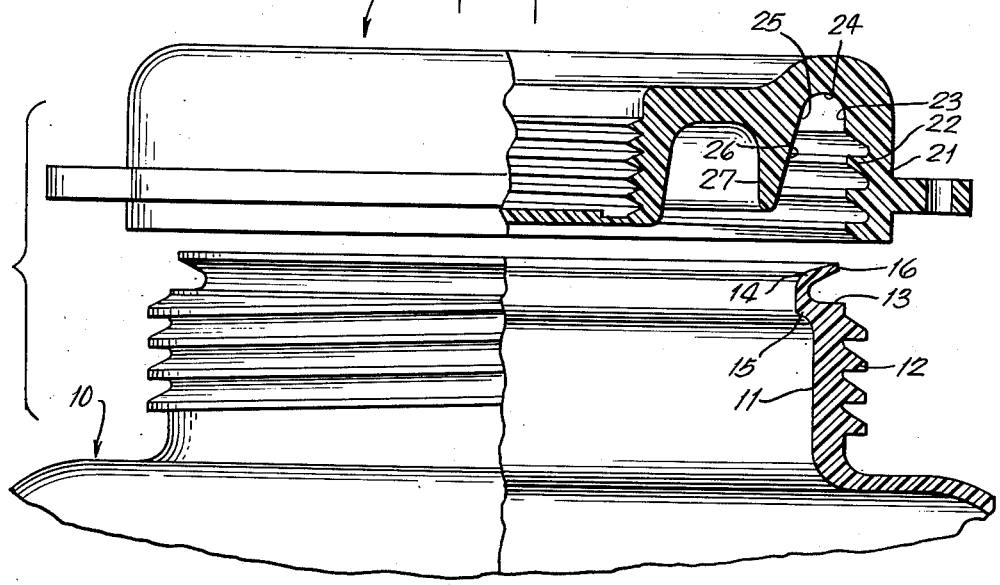
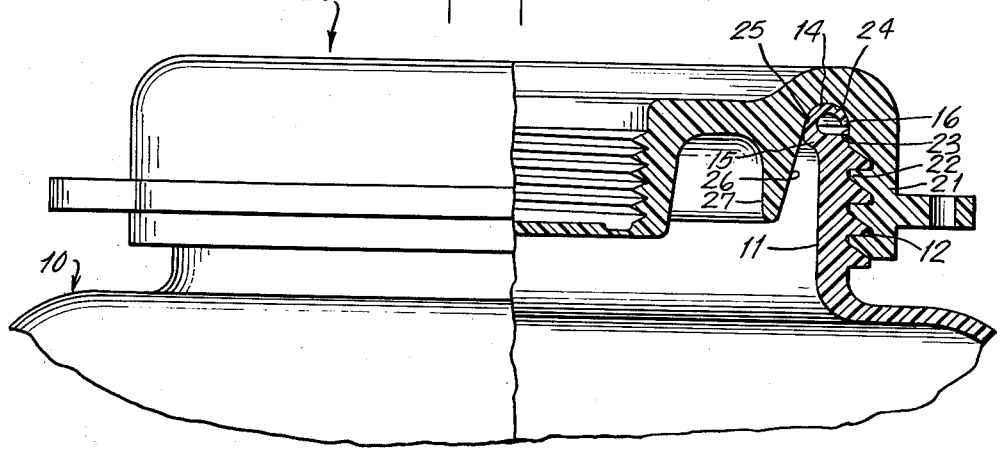
INVENTOR.
ANTHONY J. STARR
BY
ATTORNEYS

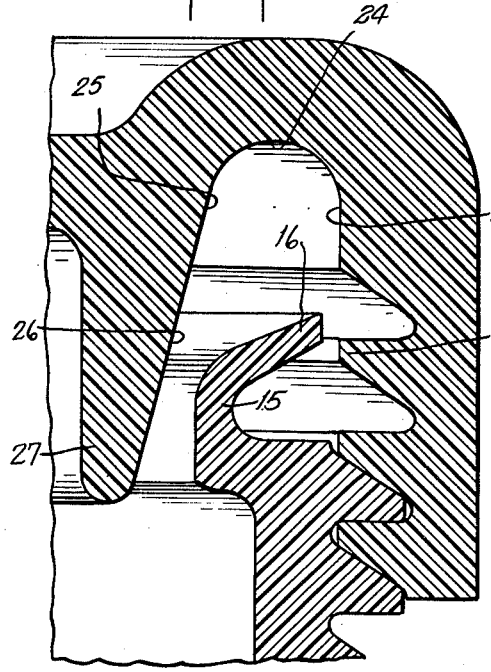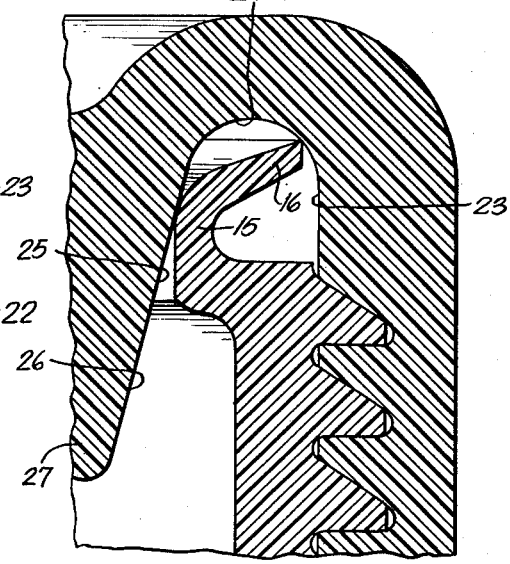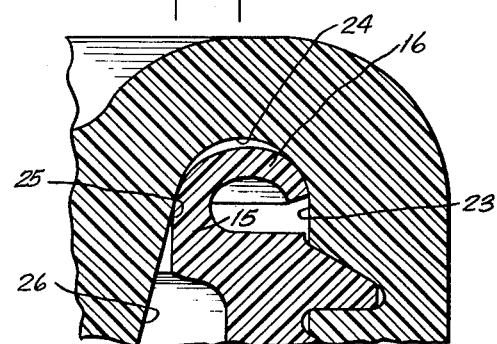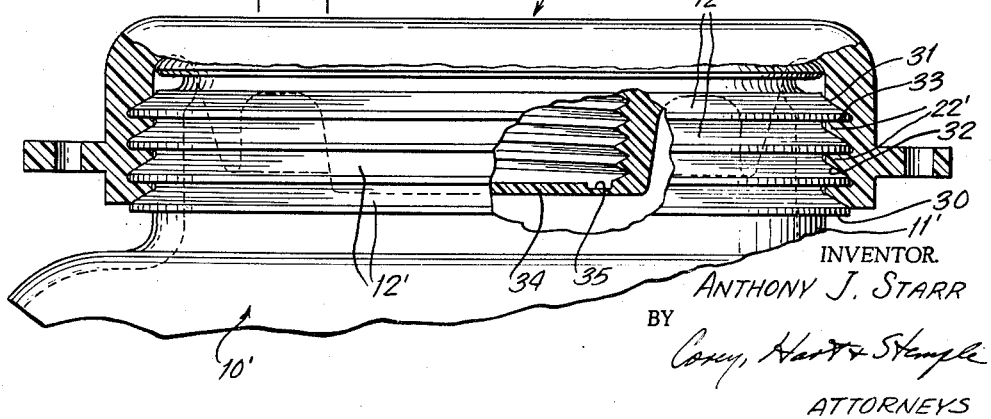

United States Patent Office 3,189,072
Patented June 15, 1965

3,189,072
CONTAINER OUTLET AND CLOSURE THEREFOR
Anthony J. Starr, Wilmington, Del., assignor to Container Corporation of America, Chicago, Ill., a corporation of Delaware
Filed Feb. 8, 1963, Ser. No. 257,235
10 Claims. (Cl. 150—.5)

This invention relates to containers and is more particularly concerned with the provision of a novel container outlet and closure cap assembly made of flexible material and enabling the achievement of a reliable seal therebetween without the necessity of employing sealing gaskets.

It is highly desirable in the packaging of many products to effect the seals of the containers therefor by the use of container outlets and closures which are made of elastomeric materials ranging from pure gum rubber to complex compounds formulated to resist specific hostile environments. Thus, plastic containers with pouring outlets or flanges closed by closure caps are today employed in large numbers in the storage, handling and shipping of certain commodities because of the plastic's inert and/or corrosion resistant qualities. Many of the most desirable elastomeric materials used in such containers, and especially molded containers, are of an inherently flexible and yielding nature and therefore do not readily lend themselves to the provision of efficient seals. Further, it is undesirable or impossible, in some instances, to attempt to form such materials in a rigid, non-yielding container outlet, because of good design and economical considerations and certain manufacturing process limitations. This problem of flexibility is more marked in outlets of large diameters because of their greater susceptibility to the strains and distortions encountered in handling and shipping. Elastomeric materials of a flexible and yielding nature are also often difficult to control with sufficient precision in ordinary manufacturing practices to render them satisfactory for the manufacture of parts that will be intimately mated, as in the formation of gas and liquid tight seals. The resulting great range of tolerances usually present in such parts, especially in the critical mating areas, is likely to cause faulty closures, substandard outlets, and rejects, and, in some instances, make necessary elaborate post-working of such parts to assure consistant fit. The art has to some extent overcome this difficulty by the use of elastomeric gaskets of various shapes and sizes. Frequently, however, a compound that can be safely stored in plastic containers, will attack and destroy a wide range of elastomeric gasketing materials. Consequently, it is necessary to use great care and elaborate testing to select the correct formulation for the sealing member to be utilized in connection with certain compounds, all of which substantially add to the cost of the assembled container.

It is the primary purpose of the present invention to provide a container outlet and closure cap assembly which is made of inherently flexible and yielding elastomeric material and yet which is free of the aforesaid disadvantages.

Another object of the invention is to provide a container outlet and closure cap assembly in which both parts are made of flexible and yielding elastomeric material and which are so formed that when they are assembled, they are substantially stronger than in their unassembled condition.

A further object of the invention is to provide a container outlet and closure cap assembly which is capable of providing a useful and practical seal-off without the aid of sealing gaskets over a range of tolerances well within accepted manufacturing variations for parts constituted of a flexible and yielding elastomeric material.

Other objects, as well as the advantages of the invention, will become apparent from the following description, when read in connection with the accompanying drawings, in which FIG. 1 is a vertical sectional view of the upper portion of a container provided with a pouring outlet or flange, and with a closure therefor constructed in accordance with the invention; the outlet and closure being shown in unassembled relation;

FIG. 2 is a similar view showing the condition of such parts when the closure is in sealed condition on the outlet;

FIG. 3 is an enlarged detail in cross-section of the end portion of the container outlet and the associated sealing portion of the closure before such two parts come into engagement as the closure is being screwed into position on the outlet;

FIG. 4 is a view similar to FIG. 3 showing the condition of the parts when the closure is further advanced on the outlet;

FIG. 5 is a view similar to FIGS. 3 and 4 showing the condition of the parts when the closure is almost fully seated on the outlet; and FIG. 6 is a view similar to FIG. 2 and shows a modified form of the invention.

In the drawings, the numeral 10 indicates generally the body of a container which may be made of any suitable material and may be made of a suitable elastomeric compound that is resistant to attack by chemicals, such as polyethylene. The outlet opening in the top of the container is defined by a flange 11 molded of relatively soft, deformable plastic material, such as polyethylene which has a tendency to cold flow into a permanently deformed set under sustained pressure. The flange 11 may be integrally molded to the material of the container body 10, or may be molded separately therefrom and subsequently attached to the container body in any suitable manner known to the art. The exterior of the cylindrical body or wall of the flange 11, as shown, is provided with a thread 12 of the buttress type and has a downwardly spiralling thread surface disposed in slightly inclined relation to the central axis of flange 11 and located on the underside of the thread so that it faces downwardly. The thread 12 is of relatively few turns and is relatively heavy and massive with a blunt substantially wide outer edge and a top surface which is inclined at substantially 33° to the horizontal so that at its base the thickness of the thread approximates the thickness of the cylindrical body of the flange. As a result of such construction, the thread 12 has sufficient ruggedness to prevent distortion of the polyethylene material of such thread under outward pressures that may be exerted thereon in forming the seal, and to prevent substantial cold flow of the material of such thread under such outward pressures. The thread 12 may be of another type than the buttress type, for example, a regular 60° V thread, or a square thread, and when formed in such other type should also be made heavy and massive to provide the aforesaid rugged qualities.

Above the start of the flange thread 12, or the top thereof, the cylindrical flange wall terminates in a horizontal annular surface 13 disposed substantially at right angles to the central axis of flange 11. The annular surface 13 has a width greater than one half the thickness of such flange wall and preferably approximating two-thirds the thickness of such wall as indicated in the drawings. Integrally formed with the inner peripheral edge portion of the upper end of the flange wall is an arcuately shaped extension 14 which in cross-section initially extends inwardly and then upwardly and outwardly so that its upper end overlies in spaced relation the annular surface 13 and there is formed by such extension 14 adjacent to the start of thread 12 an exterior annular concave groove. It will be noted in FIG. 1, that the base of the root 15 of the extension 14 is located almost wholly below the annular surface 13 and has a thickness approximating the width of the latter. The root 15 projects inwardly from the interior surface of the cylindrical flange wall, then curves upwardly and outwardly through approximately 150° so that its general form, in cross-section, is arcuate. Throughout this length of the root, it has a general thickness substantially less than the thickness of the flange wall; approximately one half the latter; so that the root 15 has a substantially greater flexibleness than the flange wall. The outer end portion 16 of extension 14 starts at a circle approximately overlying the circular inner edge of the annular surface 13 and gradually diminishes in thickness toward the outer edge thereof. The end portion 16, in cross-section, is substantially straight and inclined upwardly and outwardly from the curved root portion 15 of the extension 14. The outer edge of extension 14 has a thickness approximately one half the general thickness of the root portion 15 and a diameter equal to or less than the diameter of the thread root of the buttress thread 12 or of the outer periphery of the annular top surface 13. The outer end portion 16 of extension 14 is spaced above the annular surface 13 a distance approximating the pitch diameter of the thread 12.

The mating closure cap is indicated generally in the drawings by the numeral 20 and like the flange 11 is molded of relatively soft, deformable plastic material such as polyethylene. The cap 20 comprises an outer cylindrical wall 21 provided with an internal thread 22 which complements the thread 12 formed on the flange 11. As in the case of thread 12, the internal thread 22 may be of any suitable type adapted to the plastic material employed to provide such thread with the ruggedness necessary for satisfactory use of the closure. At this time, it may be pointed out that it is within the contemplation of the invention to employ other means than screw threads for coupling the closure cap to the flange 11 in a manner to enable the satisfactory practice of the invention. In the closure cap illustrated, the start of the thread 22 is located on the lower inner rim of the cap wall 21 and the thread spirals upwardly therefrom through a few turns. Adjacently above the upper terminal end of the thread 22 is a circular concave cavity having a substantially perpendicular outer side wall 23, an inner end wall 24 which in cross-section is semi-circular, and an inner side wall 25 which is disposed in opposed relation to the outer side wall 23, but which is inclined inwardly and downwardly. The three walls 23, 24 and 25 join smoothly and without interruption so that the total area thereof can be utilized as a camming surface for the extension 14 on the flange 11 as the cap is being screwed onto the flange. The end wall 24 has a radius in cross-section which is slightly greater than one half the outside width of the extension 14 so that the upper end of the latter can come into engagement with such end wall. It will be noted also from the drawings, that while the center of the radii defining the end wall 24, in cross-section, is spaced the length of a radius from the inner edges of the thread 22, the outer edge of the extension 14 is spaced inwardly from the root line of its associated thread 12. Further, the diameter of the annular inner side wall 25 at its juncture with end wall 24 is greater than the inside diameter of the extension 14. It will thus be seen that as the closure cap is screwed down on the flange 11, the extension 14 will be deflected and forced outwardly as it slides up the inner side wall 25 and into engagement with the end wall 24.

The inner side wall 25 constitutes an upper end extension of the outer wall 26 of a tapered downwardly extending conical member 27; such side wall 25 and outer wall 26 having the same inclination to the vertical, namely, within the approximate range of from 5° to 20°. The conical member 27 may have any desired length depending on the use contemplated therefor and is preferably made in the form of a large heavy section to enable it to function also as a structural reenforcing member to overcome flexibility of the plastic material of which the cap is made.

It will be understood from the foregoing, that as the closure cap 20 is being screwed down on the flange 11, the central conical member 27 of the cap will advance into the flange opening. As the closure cap moves further down on the flange 11, the outer surface 26 of the conical member and the inner side wall 25 of the circular cavity in the cap successively come into contact with the interior surface of the extension 14 and progressively force such extension outwardly toward the outer side wall 23 of such cavity and until the upper outer edge of such extension 14 contacts such side wall 23 (note FIG. 4). At about the same time, the semi-circular end wall 24 of the cavity contacts the upper surface of the extension 14. The action of these two walls 23 and 24 on the outer end portion 16 of the extension 14, as the extension is being forced into seated relation on the wall 24, causes the outer edge of such extension end portion initially to firmly seat against the wall 23 (as in FIG. 4), then causes such extension end portion 16 to buckle upwardly toward the wall 24 (note FIG. 5), and finally causes such extension end portion to curl downwardly to form a bead within the recess, as shown in FIG. 2 of the drawings.

It has been found that when a flexible cylindrical body such as the flange 11 has its upper rim rolled into a bead, even though such body is made of a soft pliable material such as polyethylene, it is given such structural enforcement that considerable improvement in the stability of its shape is effected. By reason of the special shape given to the upper rim of the flange, i.e., the extension 14, the bead as it is being formed has an inherent tendency, due to tensional forces, to be drawn into a smooth concentric and symmetrical form. This tendency is quite pronounced with inherently flexible plastic materials, such as polyethylene. As a result of the aforesaid construction of the closure cap while such bead is being formed, as the cap is drawn snugly down onto the flange extension, the latter is stretched outwardy under tension and the outer periphery thereof under a guided camming effect is caused to move downwardly and inwardly to form a bead whose profile or exterior surface is forced into intimate contact with the walls of the groove cavity. By controlling the dimensions of the flange and closure cap, a precise fit of the bead in the cap cavity can be obtained with the use of relatively little force, or the bead can be caused to be jammed in such cavity under high tension with the exercise of a large force, a condition which may be desirable where severe service requires that the cap and flange be most securely connected together as is necessary in large shipping containers.

It will be noted also that even though the flange extension 14 is not rolled into a completely circular bead, it provides a concentric tension fit in the closure cap cavity sufficient to provide an effective seal. It has been found that in the use of the assembly of this invention, primary seal-off occurs when the tapered conical member 27 initially cams the extension outwardly as the closure cap is being screwed onto the flange. It is believed that this results because the flexible, inherently elastic nature of the plastic material of these two parts, under the firm uniform pressure exerted thereon, causes such parts to come into a locked, tight, substantially uniform contact, throughout the entire area of their engagement that there is afforded a reliably effective seal even under the pressures created merely by screwing the cap on the flange. This condition is amplified and strengthened as the outer periphery of the flange extension comes into tight engagement with the cavity walls 23 and 24 even though the bead formed thereby is not a tight one. Consequently, an effective seal can be made between the cap and flange even though there are substantial variations in the dimensions and configurations of the coacting parts thereof because of the difficulties of manufacturing them with precise dimensions. It has been found also that the deflected flange extension so captured under tension in the cap cavity, enhances the grip of the mating threads on the flange and cap even though there may be wide variances in the tolerances of such threads because of the plastic material used and consequently makes possible a secure threaded engagement which would be otherwise impossible with the threads per se. As previously indicated, this coaction of the cap and flange extension also reenforces the flexible flange to the extent that it prevents such movement and deformation of the flange and such loss of contact of the flange with the cap, as might tend to render the sealing joint inoperative or to destroy the reliableness of the cap as a closure under the stresses, strains and other forces to which the container is subjected in usage. The effectiveness of the seal produced by the flange and closure of this invention have been substantiated by the successful survival of containers embodying the invention to tests under severe conditions of vibration, drop impact, storage and pressure, such as are required for example, by the Federal Interstate Commerce Commission for drums used in interstate traffic.

As previously mentioned any suitable means other than screw threads may be employed for coupling the closure cap to the flange. In this connection, FIG. 6 of the drawings shows a form of coupling means which has special advantages in combination with the invention. The constructions of the flange 11' and its extension 14' on the container 10' illustrated in FIG. 6, and of the closure cap 20' therefor are substantially similar to the above described constructions of the flange 11 and the cap 20, respectively, and differ from the latter only in the following manner. Instead of a screw thread 12 such as is provided on flange 11' is provided with a series of annular projecting ridges or ribs 12' of a frusto-conical shape which in cross-section is comparable to the cross sectional configuration of the thread 12 to provide an undersurface or shouldered wall 30 disposed at substantially right angles to the axis of flange 11' and a downwardly tapered wall 31 to facilitate the downward movement of the closure disc into closed position. Cap 20' is also provided with a series of annular projecting ridges or ribs 22' of a frusto-conical configuration similar to that of the ribs 12' but disposed in the opposite direction so that the tapered walls 32 thereof cooperate with walls 31 of the ribs 12' to facilitate downward movement of the closure disc, and so that the shouldered walls 33 thereof coact with walls 30 of the ribs 12' to lock the disc 20' in position on the flange 11'.

It will be apparent that with the foregoing structure, the sealing engagement of the closure with the flange can be achieved in a rapid manner and by merely forcing the closure cap downwardly over the flange in one motion to simultaneously affix the cap onto the flange and to affect the desired seal. This seal will be effective at whatever the position the closure cap is left and even though there are wide variances in the tolerances of the ribs 12' and 22' for the same reasons given in the discussion of the construction shown in FIGS. 1 to 5. When affixed in position on the flange, the closure disc can be rotated through 360° while still maintaining a reliable liquid-tight and pressure-tight seal. This feature is of especial advantage when a dispensing nozzle is incorporated with the closure cap as it permits adjustment of such nozzle in accordance with the direction in which it is desired to withdraw the product from the container. Thus construction also provides a reliable tamper proof seal since the closure cap becomes permanently engaged with the flange and the contents of the container therefore can only be renewed by damaging or destroying the closure cap. On the other hand, convenient access to such contents may be obtained through a membrane 34 provided in the central portion of the cap 20' and weakened with a circular cutout or puncture zone 35 to permit the ready removal thereof.

While there has been hereinabove described and illustrated in the drawings, preferred embodiments of the invention, it will be apparent to those skilled in the art that various changes and modifications thereof may be made within the spirit of the invention and the scope of the appended claims.

What is claimed is:

1. In a container structure, a tubular outlet constituted of flexible elastomeric material and having a cylindrical body wall provided with coupling means adapted to interengage with coupling means provided on a closure cap, and having at the top of said body wall an upwardly disposed, annular extension of substantially greater flexibility than said body wall and shaped to form with the top edge of said body wall an exterior annular concave groove, said extension being integral with the inner peripheral edge portion of the upper end of said body wall, and extending therefrom inwardly and upwardly, and then outwardly and upwardly, so that the lower portion thereof form at the upper end of said body wall an interior bead having an interior diameter substantially smaller than the interior diameter of said body wall and from which rises the upper portion of said extension arranged with such lower portion in the form of a compound curve in cross-section such as to enable a closure cap by engagement therewith to compressibly deform such upper end portion downwardly and inwardly with a rolling action thereof overlies said top edge in such spaced relation that a closure cap may roll such upper end portion toward said top edge.

2. Container structure such as defined in claim 1, wherein said lower portion of said extension is generally arcuate shaped in cross-section and has a general thickness substantially less than the thickness of said body wall, and wherein the upper end portion of said extension is thinner than and extends upwardly from such bottom section to an extent that it is substantially more flexible than said lower portion, said upper portion when compressibly deformed by said cap being substantially rigidified by such deformation.

3. In a container structure having a tubular outlet constituted of flexible plastic material and provided at the top thereof with an upwardly disposed, annular extension of of substantially greater flexibility than the body of said outlet and shaped to form with the top edge of such outlet body an exterior annular concave groove, the configuration of said extension in cross-section being that of a compound curve such as to enable it to be compressibly deformed in a rolling fashion downwardly toward the top edge of said outlet body, a closure cap of flexible elastomeric material and having an outer depending wall provided with coupling means adapted to interengage with coupling means provided on the body of said outlet, and having above said coupling means a downwardly opened concentric cavity overhanging the top end of said outlet body and formed by an annular, substantially vertical outer side wall with an interior diameter substantially the same as the diameter of the outer periphery of the top edge of said outlet body, an inner end wall that is semi-circular in cross-section and defined by a radius greater than one half the width of said extension, and an inner side wall disposed in opposed relation to said outer side wall but being inclined inwardly and downwardly from said inner end wall, said three walls joining smoothly and without interruption, and the diameter of said inner side wall at its juncture with said end wall being greater than the inside diameter of the extension on the outlet so that when said closure cap is coupled to said outlet, said inner side wall will expand the upper end portion of such extension outwardly to bring the outer edge of such extension into contact with said outer side wall to enable said inner end wall to roll such extension into bead form.

4. In a container structure, a tubular outlet and a cooperating closure disc therefor, both constituted of flexible elastomeric material and provided with interengageable coupling means, said outlet having a cylindrical body wall provided at its top with an extension of substantially greater flexibility than said body wall and shaped to form with the top edge of said body wall an exterior annular concave groove, the lower portion of said extension having an interior diameter less than the interior diameter of said body wall, and the outer upper edge of said extension overlying the outer edge portion of said body wall top edge, the configuration of said extension in cross-section being that of a compound curve such as to enable it to be compressibly deformed in a rolling fashion downwardly toward the top edge of said outlet body, said closure cap having a downwardly opened concentric cavity overhanging the top end of said outlet body wall, and formed by a vertical outer side wall having an interior diameter substantially the same as the diameter of the outer periphery of said top edge, an inner end wall that is arcuately-shaped in cross-section, and an inner side wall disposed in opposed relation to said outer side wall and inclined inwardly and downwardly from said inner end wall, the diameter of the junction of said inner end wall and said inner side wall being greater than said interior diameter of said lower portion of said extension so that when said closure cap is coupled to said outlet, said inner side wall will expand such extension outwardly to bring the outer edge thereof into contact with said outer side wall to enable said inner end wall to roll such extension into bead form.

5. In a container structure, a tubular outlet constituted of flexible elastomeric material and having a cylindrical body wall provided on its exterior with a plurality of parallelly arranged annular ridges, each having an annular latching surface disposed downwardly and an annular inclined camming surface extending upwardly and inwardly from the outer edge of said ridge, and said outlet having at its upper end a sealing extension of greater flexibility than said body wall and shaped to readily form a sealing bead at the top of said body wall, the configuration of said extension in cross-section being that of a compound curve such as to enable it to be compressibly deformed in a rolling fashion downwardly toward the top edge of said outlet body, a closure cap consituted of flexible elastomeric material and having an outer depending wall provided on its inner side with a plurality of parallelly arranged annular ridges adapted to interlock with the ridges on said outlet, said closure cap ridges each having an annular latching surface disposed upwardly and an annular inclined camming surface extending downwardly and outwardly from the outer edge of said ridge, and said closure cap having above said ridges thereof a downwardly opened concentric cavity overhanging the top end of said body wall and formed to receive said sealing extension and to shape the same into a sealing bead as said closure cap is pushed straight down on said outlet to bring the cooperating ridges thereof into interlocked relation.

6. In a container structure, a tubular outlet constituted of flexible elastomeric material and having a cylindrical body wall provided with coupling means adapted to interengage with coupling means provided on a closure cap, and having at the top of said body wall an upwardly disposed, annular extension of substantially greater flexibility than said body wall and shaped to form with the top edge of said body wall an exterior annular concave groove, said extension being integral with the inner peripheral edge portion of the upper end of said body wall, and extending therefrom inwardly and upwardly, and then outwardly and upwardly, so that the lower portion thereof forms at the upper end of said body wall an interior bead having an interior diameter substantially smaller than the interior diameter of said body wall and from which rises the upper portion of said extension arranged with such lower portion in the form of a compound curve in cross-section so as to enable it to be compressibly deformed in a rolling fashion downwardly toward the top of said body portion to accentuate the bead-like configuration of said extension by an oppositely disposed curved camming surface provided on the underside of the closure cap for the outlet.

7. In a container structure, a tubular outlet constituted of flexible elastomeric material and having a cylindrical body wall provided with coupling means adapted to interengage with coupling means provided on a closure cap, and having at the top of said body wall an upwardly disposed, annular extension of substantially greater flexibility than said body wall, said extension being integral with the upper end of said body wall and extending upwardly therefrom, the lower portion of said extension forming at the upper end of said body wall an interior bead having an interior diameter substantially smaller than the interior diameter of said body wall and from which rises the upper portion of said extension arranged with such lower portion in the form of a compound curve in cross-section so as to enable it to be compressibly deformed in a rolling fashion downwardly toward the top of said body portion to increase the rigidity of said extension by an oppositely disposed curved camming surface provided on the underside of a closure cap for the outlet.

8. Container closure such as defined in claim 7, wherein said extension is generally arcuate shaped in cross-section, the bottom end portion thereof being located within the area defined by said body wall and said upper portion of said extension extending upwardly and outwardly from such bottom end thereof, the maximum thickness of said extension being in said bottom end portion thereof and being substantially less than the thickness of said body wall.

9. In a container structure having a tubular outlet constituted of flexible plastic material and provided at the top thereof with an extension of substantially greater flexibility than the body of said outlet and shaped to form with the top edge of such outlet body an exterior annular concave groove, the configuration of said extension in cross-section being that of a compound curve such as to enable it to be compressibly deformed in a rolling fashion downwardly toward the top edge of said outlet body, a closure cap of flexible elastomeric material and having an outer depending wall provided with coupling means adapted to interengage with coupling means provided on the body of said outlet, and having above said coupling means a downwardly opened concentric cavity overhanging the top end of said outlet body, said closure cap having an inner depending wall disposed in spaced, opposed relation to said outer depending wall and being inclined inwardly and downwardly from said concentric cavity, the diameter of said inner depending wall at the lower end thereof being less than the inside diameter of the extension on the outlet and progressively increasing so that intermediate the height of such wall the diameter thereof is greater than the inside diameter of such extension, whereby when said closure cap is coupled to said outlet, said inner depending wall will expand said extension outwardly, said extension in such expanded condition and said inner depending wall in the coupled condition of said closure cap and outlet, forming a liquid tight seal for the contents of the container.

10. In a container structure, a tubular outlet and a cooperating closure disc therefor, both constituted of flexible elastomeric material and provided with interengageable coupling means, said outlet having a cylindrical body wall provided at its top with an extension of substantially greater flexibility than said body wall and shaped to form with the top edge of said body wall an exterior annular concave groove, the lower portion of said extension having an interior diameter less than the interior diameter of said body wall, the configuration of said extension in cross-section being that of a compound curve such as to enable it to be compressibly deformed in a rolling fashion downwardly toward the top edge of said outlet body, said closure cap having a downwardly opened concentric cavity overhanging the top end of said outlet body wall, and formed by a vertical outer side wall having an interior diameter substantially the same as the diameter of the outer periphery of said top edge, an inner end wall that is arcuately-shaped in cross-section, and an inner side wall disposed in opposed relation to said outer side wall and inclined inwardly and downwardly from said inner end wall, the diameter of the junction of said inner end wall and said inner side wall being greater than said interior diameter of said lower portion of said extension so that when said closure cap is coupled to said outlet, said inner side wall will expand such extension outwardly to bring said extension and said inner side wall into liquid tight sealing relation.

References Cited by the Examiner

FOREIGN PATENTS

| | | |
|---|---|---|
| 209,870 | 1/56 | Australia. |
| 788,148 | 12/57 | Great Britain. |

THERON E. CONDON, *Primary Examiner.*

EARLE J. DRUMMOND, *Examiner.*